(12) United States Patent
Knauf

(10) Patent No.: US 9,610,755 B2
(45) Date of Patent: Apr. 4, 2017

(54) PACKAGING AND METHOD OF MAKING PACKAGING

(75) Inventor: Gary Knauf, Bear Creek, WI (US)

(73) Assignee: Prolamina Midwest Corporation, Westfield, MA (US)

( * ) Notice: Subject to any disclaimer, the term of this patent is extended or adjusted under 35 U.S.C. 154(b) by 1263 days.

(21) Appl. No.: 13/521,019

(22) PCT Filed: Jan. 18, 2011

(86) PCT No.: PCT/US2011/021533
§ 371 (c)(1),
(2), (4) Date: Oct. 30, 2012

(87) PCT Pub. No.: WO2011/090934
PCT Pub. Date: Jul. 28, 2011

(65) Prior Publication Data
US 2013/0040155 A1 Feb. 14, 2013

Related U.S. Application Data

(60) Provisional application No. 61/296,321, filed on Jan. 19, 2010.

(51) Int. Cl.
*B32B 27/08* (2006.01)
*B32B 37/02* (2006.01)
(Continued)

(52) U.S. Cl.
CPC .............. *B32B 29/00* (2013.01); *B32B 7/12* (2013.01); *B32B 27/08* (2013.01); *B32B 27/10* (2013.01);
(Continued)

(58) Field of Classification Search
CPC ......... B32B 29/00; B32B 27/08; B32B 27/10; B32B 27/16; B32B 27/28; B32B 27/32;
(Continued)

(56) References Cited

U.S. PATENT DOCUMENTS 5,679,422 A * 10/1997 Lind ...................... B32B 27/32
428/34.8
5,794,770 A 8/1998 Plomgren et al.
(Continued)

FOREIGN PATENT DOCUMENTS

CA 2797570 A1 7/2011
CA 2797763 A1 7/2011
(Continued)

OTHER PUBLICATIONS

International Search Report for PCT/US2011/021535 dated Mar. 21, 2011.
(Continued)

*Primary Examiner* — Philip Tucker
*Assistant Examiner* — Vicki Wu
(74) *Attorney, Agent, or Firm* — McLane Middleton, Professional Association

(57) ABSTRACT

Packaging and a method of making the packaging is disclosed. The packaging includes a substrate with an asymmetrical coextrusion attached there to. The coextrusion includes an ethylene vinyl alcohol layer that is disposed toward the substrate.

17 Claims, 2 Drawing Sheets

(51) Int. Cl.
  *B32B 37/00* (2006.01)
  *B32B 27/30* (2006.01)
  *B32B 27/10* (2006.01)
  *B32B 29/00* (2006.01)
  *B32B 27/16* (2006.01)
  *B32B 27/28* (2006.01)
  *B32B 27/32* (2006.01)
  *B32B 27/34* (2006.01)
  *B32B 27/36* (2006.01)
  *B32B 7/12* (2006.01)

(52) U.S. Cl.
  CPC .............. *B32B 27/16* (2013.01); *B32B 27/28* (2013.01); *B32B 27/306* (2013.01); *B32B 27/308* (2013.01); *B32B 27/32* (2013.01); *B32B 27/322* (2013.01); *B32B 27/327* (2013.01); *B32B 27/34* (2013.01); *B32B 27/36* (2013.01); *B32B 29/002* (2013.01); *B32B 2250/24* (2013.01); *B32B 2255/10* (2013.01); *B32B 2255/205* (2013.01); *B32B 2255/26* (2013.01); *B32B 2270/00* (2013.01); *B32B 2307/546* (2013.01); *B32B 2307/7244* (2013.01); *B32B 2307/7248* (2013.01); *B32B 2439/70* (2013.01); *Y10T 428/3192* (2015.04); *Y10T 428/31743* (2015.04); *Y10T 428/31797* (2015.04); *Y10T 428/31855* (2015.04); *Y10T 428/31895* (2015.04); *Y10T 428/31909* (2015.04); *Y10T 428/31928* (2015.04)

(58) Field of Classification Search
  CPC ....... B32B 27/322; B32B 27/34; B32B 27/36; B32B 2255/205; B32B 2255/26; B32B 2270/00; B32B 2307/546; B32B 2307/7244; B32B 2307/7248; B32B 2439/70; Y10T 428/31743; Y10T 428/3192; Y10T 428/31895; Y10T 428/31909; Y10T 428/31928; Y10T 428/31855; Y10T 428/31797
  USPC ...................................................... 156/244.11
  See application file for complete search history.

(56) References Cited

U.S. PATENT DOCUMENTS

| | | | | |
|---|---|---|---|---|
| 6,063,417 | A * | 5/2000 | Paleari | B32B 27/08 426/127 |
| 6,242,087 | B1 * | 6/2001 | Kawai | B32B 27/08 428/336 |
| 6,383,589 | B1 * | 5/2002 | Horan | A01K 87/00 428/36.91 |
| 6,479,154 | B1 * | 11/2002 | Walton | A41D 31/0016 428/424.4 |
| 6,521,312 | B1 * | 2/2003 | Keiser | B32B 27/08 428/213 |
| 7,794,804 | B2 | 9/2010 | Jerdee et al. | |
| 2004/0245138 | A1 | 12/2004 | Penttinen et al. | |
| 2005/0217932 | A1 | 10/2005 | Woodman et al. | |
| 2006/0051537 | A1 | 3/2006 | Katayama et al. | |
| 2006/0074393 | A1 * | 4/2006 | Smith | A61J 1/10 604/408 |
| 2006/0172143 | A1 | 8/2006 | Breese et al. | |
| 2007/0149678 | A1 * | 6/2007 | Apoorva | B32B 7/12 524/430 |
| 2008/0070047 | A1 | 3/2008 | Rehkugler et al. | |
| 2008/0274245 | A1 * | 11/2008 | Lee | B32B 7/12 426/394 |
| 2009/0324861 | A1 | 12/2009 | Penttinen et al. | |
| 2013/0037556 | A1 | 2/2013 | Knauf | |
| 2013/0040155 | A1 | 2/2013 | Knauf | |

FOREIGN PATENT DOCUMENTS

| | | |
|---|---|---|
| WO | WO2011/090934 A1 | 7/2011 |
| WO | WO2011/090936 A1 | 7/2011 |

OTHER PUBLICATIONS

International Preliminary Report on Patentability for PCT/US2011/021535 dated Jul. 24, 2012.
International Preliminary Report on Patentability for PCT/US2011/021533 dated Jul. 24, 2012.
Canadian Office Action received in CA2797570 dated Dec. 11, 2014.
International Search Report for PCT/US11/21533 dated Feb. 23, 2011.

* cited by examiner

PACKAGING AND METHOD OF MAKING PACKAGING

CROSS-REFERENCE TO RELATED APPLICATIONS

This is the United States National Stage of Patent Cooperation Treaty Application No. PCT/US11/21533 filed in the U.S. Patent and Trademark Office on Jan. 18, 2011. The application claims priority to Patent Cooperation Treaty Application No. PCT/US11/21533, filed Jan. 18, 2011, and U.S. Provisional Application Ser. No. 61/296,321, filed Jan. 19, 2010, the disclosures of which are hereby incorporated herein by reference in their entirety to the extent permitted by law.

STATEMENT REGARDING FEDERALLY SPONSORED RESEARCH

Not applicable.

TECHNICAL FIELD

This disclosure relates to packaging and, in particular, to layered packaging for food or other items in which freshness is to be maintained.

BACKGROUND OF THE INVENTION

Flexible packaging, particularly for food, is subject to many demands. The packaging needs to be workable in such a way that the packaging material may be quickly placed around the item to be packaged using machinery. The packaging material must also be of such a quality that it adequately stores the product before the packaging is open. In the case of food products, this typically means that the packaging materials provide an oxygen barrier to maintain freshness.

Ethylene vinyl alcohol (EVOH) is an extrudable resin that has excellent oxygen, flavor, and aroma barrier properties. EVOH resins and packaging materials have been used for several decades as meat and cheese film wrappers and the barrier properties of EVOH with respect to oxygen, grease, oil, flavor additives, and aroma is well understood.

However, when exposed to humidity levels of 85% or higher, the barrier properties of EVOH degrade. To avoid this degradation, the EVOH is typically extruded in a multi-layer symmetrical coextrusion in which specialized tie resins are used to adhere the EVOH to outer polyolefin layers that protect the EVOH from humidity. For example, a three resin, five layer coextrusion of EVOH may include LDPE-Tie Resin-EVOH-Tie Resin-LDPE. In this five layer structure, the LDPE (low density polyethylene) layers protect the EVOH layer from exposure to moisture. Also, the LDPE and Tie Resin are extruded each from one extruder where they are split into two layers and directed to either side of the EVOH layer by a feedblock device. The LDPE and Tie Resin are exactly the same material on both sides of the EVOH, thus it is called a symmetrical coextrusion.

It should be further understood that, when melted, EVOH becomes fluid very quickly with very low melt strength and cannot be extruded as a separate thin film. In extrusion coating, a melt curtain is formed between the exit of the extruder die and the extruder nip. The melt curtain is completely unsupported in this air gap between the die and the extruder nip. Therefore, the melt curtain needs to have enough viscosity and melt strength to keep from tearing apart. Thus, EVOH has traditionally required the above-described five layer structure not only to maintain its barrier properties, but also to provide adjacent structural layers (such as polyethylene (PE)) that physically support the coextruded layer of the EVOH. Thus, while EVOH has excellent oxygen barrier properties, EVOH has been considered unsuitable as a barrier layer in some applications for a number of reasons. For one, production of EVOH has required extrusion machines capable of coextruding more than two resins. Such machines are very expensive and not as common as those extruding only two resins. Further, dual tie resin and polyolefin layers are provided on both sides of the EVOH coextrusion to protect the EVOH layer from humidity; however, these multiple layers can increase the material cost of the packaging and increase the thickness of the packaging. This has made EVOH-based packaging less competitive for certain packaging applications.

Hence, there is a continuing need for improved and lower cost EVOH packaging and a method of making the same.

SUMMARY OF THE INVENTION

Packaging for food and a method of making the packaging is disclosed. This packaging incorporates an EVOH layer which serves as an oxygen barrier to the surrounding environment. However, the packaging does not include the symmetrical five layer coextruded structure heretofore believed to be necessary both to support an EVOH layer and to further protect this EVOH layer from moisture which can compromise its effectiveness. Moreover, in some forms, the packaging can be formed using a standard two resin capable coextruder station which reduces the cost of fabricating the packaging—in comparison to the traditional five layer structure using a three resin coextruder station.

The packaging includes a substrate and an asymmetrical coextrusion attached to the substrate. The asymmetrical coextrusion includes an ethylene vinyl alcohol layer that is disposed toward the substrate.

In some preferred forms, the packaging may further include a polymeric moisture barrier layer applied to at least one side of the substrate. The ethylene vinyl alcohol layer of the asymmetrical coextrusion may be attached to the polymeric barrier layer. The polymeric barrier layer may be a polymeric moisture barrier layer and be used to protect one side of the ethylene vinyl alcohol from exposure to moisture in the packaging. This polymeric barrier layer may include any of a number of materials including low density polyethylene, medium density polyethylene (MDPE), high density polyethylene (HDPE), linear low-density polyethylene (LLDPE), metallocene catalyzed linear low density polyethylene (mLLDPE), polypropylene (PP), ethylene vinyl acetate (EVA) resin, IONOMER, Nylon, ethylene acrylic acid copolymer (EAA), ethylene methacrylic acid copolymer (EMAA), ethylene methyl acrylate copolymer (EMAC), and ethylene n-butyl acrylate copolymer (EnBA). This polymeric barrier layer may also include additives such as colorants, EVOH tie resin, and fillers such as calcium carbonate. This polymeric barrier layer may also include blends or multilayered coextrusions of the above listed materials. This polymeric barrier layer is not extruded from any materials used in the asymmetrical EVOH coextrusion.

A surface of the polymeric barrier layer to which the ethylene vinyl alcohol layer is attached may be treated to promote attachment of the ethylene vinyl alcohol layer to the polymeric barrier layer. For example, the treatment may be a flame treatment, liquid priming, or a corona treatment.

In some forms, the substrate may include paper or another cellulosic material. In other forms, the substrate may be a clear or metallized film selected from a group consisting of polyethylene terephthalate (PET), polypropylene, nylon, and PLA (polylactic acid) films. Additionally, the substrate may be a lamination of paper and clear or metallized film substrates listed above.

In addition to the ethylene vinyl alcohol layer, the asymmetrical coextrusion may further include a tie resin and a sealant. In one form, the tie resin and the sealant may be blended together to form a tie sealant resin blend. In this form, the asymmetrical coextrusion may be a two layer coextrusion including the ethylene vinyl alcohol layer and a tie sealant resin blend layer which is formable using a two resin capable coextruder. In another form, the asymmetrical coextrusion may include the ethylene vinyl alcohol layer, a tie resin layer, and a sealant layer. The tie resin layer may be disposed between the ethylene vinyl alcohol layer and the sealant layer forming a three layer asymmetrical coextrusion.

Additionally, a method of making the packaging of the type described above is disclosed. In this method, a substrate is provided and an asymmetrical coextrusion including an ethylene vinyl alcohol layer is extruded. The ethylene vinyl alcohol layer of the asymmetrical coextrusion is attached to the substrate to form the packaging.

The method may further include the step of applying a polymeric barrier layer to at least a portion of at least one side of the substrate before attaching the ethylene vinyl alcohol layer of the asymmetrical coextrusion to the substrate to form the packaging. The ethylene vinyl alcohol layer may be directly attached to the polymeric barrier layer. The polymeric barrier layer could be made of low density polyethylene or one or more of the materials listed above.

The method may further include the step of treating a surface of the polymeric barrier layer prior to attaching the ethylene vinyl alcohol layer of the asymmetrical coextrusion to the substrate to form the packaging. Treating promotes adhesion between the polymeric barrier layer and the ethylene vinyl alcohol layer. This treatment may be, for example, a flame treatment, liquid priming, or a corona treatment.

As mentioned and listed above, both the substrate and the coextrusion may be made of various materials and/or blends of materials.

The foregoing and still other advantages of the invention will appear from the following description. In that description reference is made to the accompanying drawings which form a part hereof and in which there is shown by way of illustration preferred embodiments of the invention. These embodiments do not represent the full scope of the invention. Rather, the claims should be looked to in order to judge the full scope of the invention.

DETAILED DESCRIPTION OF THE INVENTION

Disclosed below are structures for a packaging containing EVOH which do not require complex coextrusion machinery configurations capable of forming five layer coextrusions. As used herein, a "-" is used to indicate layers that are coextruded with one another and "/" is used to indicate layers that are separated attached to one another.

Figure 1:
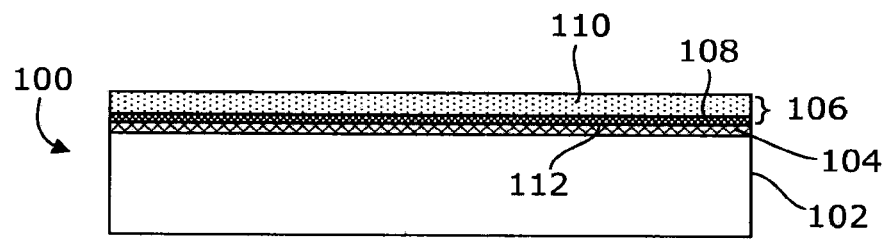
FIGS. 1 through 3 illustrate the layer structure of the three exemplary embodiments of the packaging.
Figure 2:
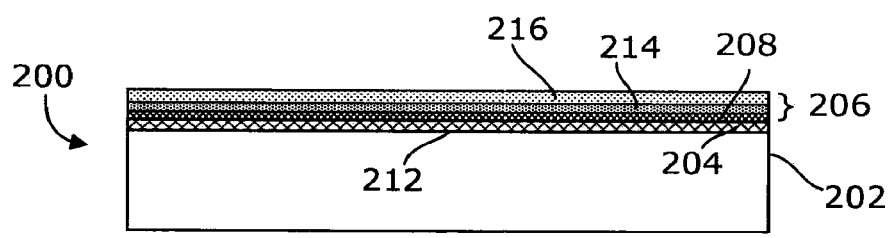
Figure 3:
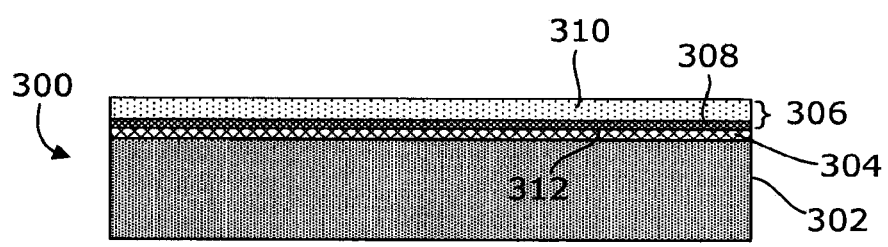

Now with reference to FIGS. 1 through 3, a number of packaging structures are illustrated including:
(1) PAPER/LDPE/EVOH-TSRB
(2) PAPER/LDPE/EVOH-TIE-SEALANT
(3) PET FILM/LDPE/EVOH-TSRB As used herein, TSRB refers to a tie resin and sealant resin blend in which the tie resin and sealant are blended together such that the blend may be coextruded as a single layer, whereas EVOH-TIE-SEALANT refers to three discrete separately formed layers of EVOH, tie resin (which is a type of resin designed to adhere the EVOH and the sealant layers together), and sealant. With respect to the figures, like reference numerals are used to describe like items in which the hundreds digit has been increased to correspond to the figure number (e.g., TSRB layer 110 corresponds to TSRB layer 310).

Looking first at FIG. 1, the layers of structure (1) listed above are illustrated. In FIG. 1, a packaging 100 includes a paper substrate 102 with a polymeric barrier layer 104 coating one side thereof and an asymmetrical coextrusion 106 having an ethylene vinyl alcohol layer 108 and a TSRB layer 110. The ethylene vinyl alcohol layer 108 of the coextrusion 106 is directly attached to the polymeric barrier layer 104 along a polymeric barrier layer—ethylene vinyl alcohol layer interface 112 such that the TSRB layer 110 on the opposite side of the coextrusion 106 constitutes one of the outer surfaces of the packaging 100. The exposed TSRB surface could be contacted with another exposed TSRB surface and subjected to heat and pressure to form a seal there between.

It is contemplated that the paper substrate may be a paper of a type having a machine glazed (MG) or a machine finished (MF) type finish, may be clay coated paper, may be of a white or a natural color, and may be of a Kraft, ground wood, recycled, or sulfite furnish. The paper may include laminations of one or more layers of paper or include a clear or metallized PET, oriented polypropylene (OPP), Nylon, or PLA film laminated to the paper.

In one preferred form, the polymeric barrier layer is low density polyethylene (LDPE). However, the polymeric barrier layer on the paper may alternatively be MDPE, HDPE, LLDPE, POP (polyolefin plastomer), mLLDPE, or blends thereof as well as coextrusions thereof. Additives such as colors can be used. Other resins can be used in place of LDPE such as PP, EVA, IONOMER, Nylon, EAA, EMAA, EMAC, EnBA, and the like. If needed, EVOH tie resin can be blended into the poly layer for improved adhesion, especially if PP or HDPE is used in place of LDPE. In all cases, the materials used for the polymeric barrier layer are not extruded from the extruders used to make the asymmetrical EVOH coextrusion.

To ensure good adhesion, the paper and/or polymeric barrier layers may be subjected to flame treatment, corona treatment, or other such priming to ready the surfaces for attachment.

With respect to the specific chemical composition of the layers, the ethylene vinyl alcohol may be 35 mol % ethylene EVOH (available as EVAL C109B from Eval Company of America) and the TSRB may be 50% POP (polyolefin plastomer, available as DOW PT1450 from Dow Chemical Company), 25% tie resin (such as ADMER AT1000A available from Mitsui Chemicals America, Inc.), and 25% LDPE (low-density polyethylene, available as CHEVRON 1013 available from Chevron Chemical). The exact percentages of the constituent components may be varied depending on the temperatures, times, and pressures used to form the heat seal and the quality of the seal desired. Although EVOH with 35 mol % or higher ethylene content is believed to provide the best results, EVOH is available in 24% ethylene to 48% ethylene content. It is contemplated that any amount of ethylene content might be used or selected based on the desired properties of the barrier or for appropriate economy. Generally speaking, the lower the ethylene content, the better the aroma and oxygen barrier provided by the EVOH layer. It is contemplated that the basis weight of the EVOH layer may be in the range of 0.1#/3,000 ft$^2$ to 10.0#/3,000 ft$^2$.

The TSRB may have a tie resin content from 10 wt % to 80 wt % and a polyethylene content from 20 wt % to 90 wt %. The tie resin may be an anhydride modified LDPE based adhesive resin concentrate such as ADMER AT1000A or DUPONT BYNEL 41E170. The polyethylene sealant resin may be LDPE, MDPE, HDPE, LLDPE, POP, mLLDPE and blends thereof, and copolymers of polyethylene such as, for example: EVA, IONOMER, EAA, EMAA, EMAC, EnBA, and the like. TSRB can be further modified with slip, antiblock, or color concentrates depending upon customer needs.

The particular tie sealant resin blend selected may be configured to maximize the quality of the seal. The basis weight of the TSRB layer may be in the range of 1.0#/3,000 ft$^2$ to 30.0#/3,000 ft$^2$ and modified to provide enough TSRB material to form a robust seal.

In order to achieve a thin and stable coating layer, EVOH is not extrusion coated as its own single layer, but can be coextruded with the TSRB or, as will be described with respect to structures (2) and (3) below, the tie resin and sealant layers. Of course, a benefit of using the tie sealant resin blend as in structures (1) and (3) is that a three resin capable coextruder is not required, but a two resin capable coextruder will be sufficient. In contrast, standard three resin, five layer EVOH extrusion coating production would require a more complex and costly coextruder, and add sealant and tie resin layers to the inside of the EVOH layer which have been rendered unnecessary by the inclusion of the polymeric barrier coating on the substrate which serves as a moisture barrier on that side of the EVOH layer.

Turning now to FIG. 2, structure (2), designated 200, is illustrated which is similar to structure (1), but in which the TSRB layer 110 of the asymmetrical coextrusion 106 has been replaced by separate tie resin and sealant layers 214 and 216, respectively. The paper substrate (202), polymeric barrier layer (204), and the interface (212) between the polymeric barrier layer and the ethylene vinyl alcohol layer are as described above. This means that the asymmetrical coextrusion 206 is a three layer coextrusion with the tie resin layer 214 sandwiched between the ethylene vinyl alcohol layer 208 and the sealant layer 216. This configuration eliminates any tie and sealant resin layers between the EVOH and substrate. Accordingly, the sealant layer 216 is disposed such that it is on an attachment face (i.e., the face that will be attached to another face of the packaging) when the packaging is heat sealed.

Now with reference to FIG. 3, the structure (3), designated 300, listed above is illustrated. Structure (3) is similar to structure (1), except that the paper substrate 102 has been replaced with a clear polyethylene terephthalate (PET) film substrate 302. The polymeric barrier layer (304), asymmetrical coextrusion (306), ethylene vinyl alcohol layer (308), TSRB layer 310 and the interface (312) between the polymeric barrier layer and the ethylene vinyl alcohol layer are as described above. According to this form, the polymeric barrier layer 304 coats at least a portion of one side of the PET film substrate 302.

In alternative forms, the PET film in structure (3) might alternatively be any kind of clear or metalized polyethylene terephthalate, polypropylene, nylon, or PLA (polylactic acid) film.

Looking at the structures (1)-(3) above, it can be seen that the EVOH coextrusion is asymmetrical in all forms, unlike the LDPE-Tie Resin-EVOH-Tie Resin-LDPE structures which have been previously produced. Now, when extruded, the EVOH layer is initially at least partially exposed with one side of the layer being supported and protected by either the tie sealant resin blend layer or the tie resin and sealant layers. As will be described in more detail below with respect to the method of making the packaging, this initially exposed side of the EVOH layer is attached or laminated to the substrate, or polymeric barrier coating thereon, such that this exposed face is no longer exposed.

It should be appreciated that in all three structures (1) through (3), the initially-exposed face of the EVOH layer is attached to a polymeric barrier layer which helps to protect that side of the EVOH layer from moisture. While this polymeric barrier layer is preferable for many applications, it is also contemplated that the polymeric barrier layer may be eliminated and the EVOH layer directly attached to the paper substrate or PET film substrate. To some extent, the removal of the polymeric barrier layer will increase the exposure of the EVOH layer to moisture which increases the rate of oxygen or aroma transmission through the EVOH layer. However, the PET film substrate may, at least to some degree, serve as a moisture barrier. Accordingly, by increasing either the substrate thickness and/or the EVOH layer thickness, the integrity of the product may be preserved for a longer period of time, even in the absence of the polymeric barrier layer. If the product to be housed in the packaging does not require good moisture vapor barrier, then it may be acceptable to remove the polymeric barrier layer.

These structures provide a number of advantages over known flexible packaging solutions. In applications where a moderate oxygen barrier is required, EVOH provides good oxygen barrier at a lower cost than Al foil, metallized PET (MPET) film, and PVDC (polyvinylidene chloride) coated PET or OPP films. Further, for those applications which previously included PVDC in the packaging materials as a barrier material, the EVOH replaces the PVDC coated flexible packaging materials with a product that can be incinerated without worries of producing hydrochloric acid or other chlorinated hydrocarbon fumes into the air.

In one preferred form for the packaging, the packaging has a structure of 25# PAPER/10# LDPE/4# EVOH-7# TSRB. (#/ream is based on a 3,000 ft$^2$ ream size) The paper basis weight can range from 9#/ream to 100#/ream. The paper may be Kraft paper with a machine glaze type finish and of bleached white color which may be flame treated for good adhesion of the LDPE to the paper. The LDPE may be corona treated for good adhesion of the EVOH coextrusion to the LDPE coated paper. The LDPE for the polymeric layer (Chevron 4517) would be of slightly higher density than the LDPE used in the TSRB (Chevron 1013). This will provide improved moisture barrier for protection of the EVOH, while the LDPE used in the TSRB would be optimized for heat seal properties. The EVOH in the 4# EVOH-7# TSRB coextrusion is 35 mol % ethylene EVOH. However, for other applications the composition of the TSRB in the coextrusion may be tweaked. In this form, the TSRB may be 25% tie resin (ADMER AT1000A) and 75% LDPE (CHEV- RON 1013). Even though a LDPE layer is present between the paper and the EVOH, it should be appreciated that the EVOH-TSRB coextrusion is formed from a single die and this part of the structure does not require more than a two resin coextruder station.

Some specific additional variations are provided below with respect to the disclosed structures. According to one form, the structure of the packaging material is 25# PAPER/ 10# LDPE/4# EVOH-1.5# TIE-5.5# PE SEALANT. In another form, the structure of the packaging material is 25# PAPER/10# LDPE/1# TIE-4# EVOH-1# TIE-5# PE SEALANT to introduce a tie layer between the EVOH and the LDPE deposited on the paper. Similarly, the type of polyethylene in the polymeric layer can be different than the LDPE used in the sealant and the thickness of the LDPE layer can be independently adjusted to optimize product performance.

Figure 4:
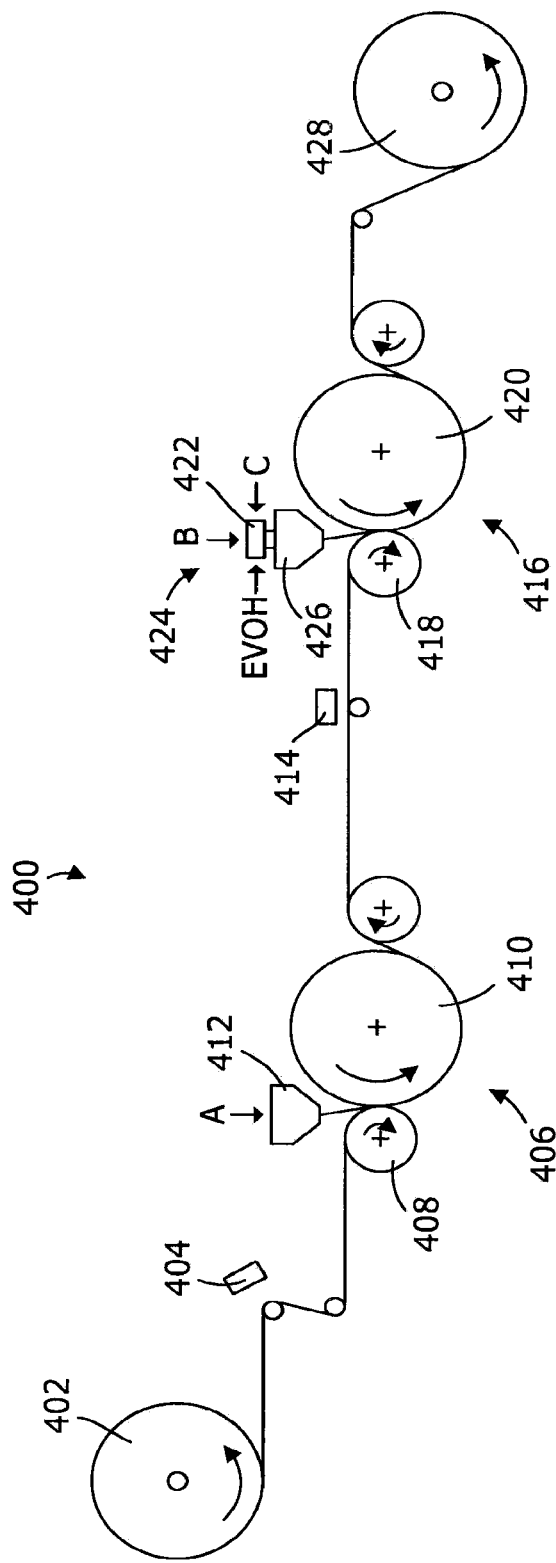
FIG. 4 illustrates an exemplary process line which may be used to make or fabricate the packaging.

Now with reference to FIG. 4, a line 400 for making the packaging is disclosed. The line 400 illustrated is suitable for making any of the structures (1)-(3) listed above. One of ordinary skill in the art will readily appreciate, however, that segments of the line 400 may be eliminated or not used based on the desired structure of the final product.

The line 400 includes two sections. The first section forms a coated substrate including the paper or PET layer with the polymeric barrier layer coated there on. The second section then applies the EVOH coextrusion to the coated substrate.

In the form shown, the first section of the line 400 prepares the substrate, which may be, for example, the paper or PET film substrate. The substrate is unrolled from a main substrate roll 402 and fed toward an extrusion coater 406 which coats the substrate with the polymeric barrier layer.

On the way to the extrusion laminator 406, the substrate from the main substrate roll 402 is fed past a treater 404 such as a flame treater or a corona treater that treats the surface of the substrate from the main substrate roll 402 such that the polymeric barrier layer created at the extrusion coater 406 will adhere well to the substrate. A liquid primer might also be applied to treat the surface. Although treatment of the substrate is depicted, it should be appreciated that such treatment is not required and some substrate materials may not need treatment prior to application of the polymeric barrier layer.

At the extrusion coater 406, the substrate is fed through a nip point at which point the polymeric barrier layer is applied on the substrate as a melt curtain. The nip point occurs between a rubber nip roll 408 and a chill roll 410. As the substrate approaches the nip point, at a location above the nip point, a die 412 supplies a molten resin A (which may be, for example, low density polyethylene or any of the polymeric barrier materials listed above) as a melt curtain. This molten resin A is applied to a top surface of the substrate at the nip point, is cooled by the chill roll 410 to form a substrate/polymeric barrier layer structure, and then this coated substrate exits the extrusion coater 406.

It should be appreciated that while the line 400 is shown including the extrusion coater 406 for the formation of the substrate/polymeric barrier layer structure, that if the coextrusion is to be directly applied to the paper that the extrusion coater station may be eliminated. Further, it is possible that the substrate could be coated by the polymeric barrier layer using methods other than an extrusion coater. For example, a spray coating could be applied to the paper or PET substrate.

In any event, the substrate may be optionally fed past a treater 414 that treats the surface of the substrate for better adhesion to the coextrusion further down the line 400. Again, the treater 414 may incorporate a flame treatment, liquid priming, or a corona treatment to prepare the surface of the substrate.

In the second portion of the line 400, a coextrusion coater 416 applies or coats the substrate with the EVOH coextrusion to form the packaging. In the coextrusion coater 416, the substrate is fed between a rubber nip roll 418 and a chill roll 420. A feedblock 422 of the coextruder 424 receives molten EVOH and at least one other molten resin B and/or C. If an EVOH-TSRB coextrusion is being formed, then the molten TSRB is also fed into the feedblock 422 (as B, with no C resin being fed) and a two layer coextrusion of EVOH-TSRB is extruded by the die 426 proximate the nip point such that the EVOH layer side contacts the paper substrate. In this form, the coextruder 424 may be only a two resin capable coextruder (i.e., the coextruder 424 does not need to be capable of receiving or extruding a molten resin C). If an EVOH-Tie-Sealant coextrusion is being formed, then in addition to the molten EVOH, the feedblock 422 receives both a molten tie resin (as B) and a molten sealant (as C) and the die 426 extrudes an EVOH-Tie-Sealant coextrusion such that the EVOH layer is applied to the substrate and laminated to the substrate at the nip point. After exiting the coextrusion coater 416, the packaging is wound up on a product wind-up roll 428.

While specific embodiments of the present invention has been shown, various modifications falling within the breadth and scope of the invention will be apparent to one skilled in the art. Thus, the following claims should be looked to in order to understand the full scope of the invention.

What is claimed is:

1. A method of making packaging, the method comprising:
   providing a substrate;
   extruding an asymmetrical coextrusion including an ethylene vinyl alcohol layer and at least one support layer, wherein the ethylene vinyl alcohol layer has a first face and a second face, wherein the first face is supported by the at least one support layer during the extrusion and wherein the second face does not interface with any other layer of the asymmetrical coextrusion; and
   attaching the second face of the ethylene vinyl alcohol layer of the asymmetrical coextrusion to the substrate to form the packaging.

2. The method of claim 1, further comprising the step of applying a polymeric barrier layer to at least a portion of at least one side of the substrate before attaching the second face of the ethylene vinyl alcohol layer of the asymmetrical coextrusion to the substrate to form the packaging.

3. The method of claim 2, wherein the second face of the ethylene vinyl alcohol layer is directly attached to the polymeric barrier layer.

4. The method of claim 2, further comprising the step of treating a surface of the polymeric barrier layer prior to attaching the second face of the ethylene vinyl alcohol layer of the asymmetrical coextrusion to the substrate to form the packaging.

5. The method of claim 4, wherein the step of treating includes flame treating the surface.

6. The method of claim 4, wherein the step of treating includes corona treating the surface.

7. The method of claim 4, wherein the step of treating includes liquid priming the surface.

8. The method of claim 2, wherein the polymeric barrier layer is low density polyethylene.

9. The method of claim 2, wherein the polymeric barrier layer includes at least one of low density polyethylene, medium density polyethylene, high density polyetheylene, linear low-density polyethylene, and metallocene catalyzed linear low density polyethylene.

10. The method of claim 2, wherein the polymeric barrier layer includes at least one of polypropylene, ethylene vinyl acetate resin, IONOMER, Nylon, ethylene acrylic acid copolymer (EAA), ethylene methacrylic acid copolymer (EMAA), ethylene methyl acrylate copolymer (EMAC), and ethylene n-butyl acrylate copolymer (EnBA).

11. The method of claim 1, wherein the substrate comprises paper.

12. The method of claim 1, wherein the substrate comprises a clear or metallized film selected from the group consisting of polyethylene terephthalate, oriented polypropylene (OPP), nylon, and polylactic acid (PLA) films.

13. The method of claim 1, wherein the one or more support layers includes a tie resin layer and a sealant layer.

14. The method of claim 1, wherein the one or more support layers includes a layer formed of a tie resin and a sealant blended together to form a tie sealant resin blend layer.

15. The method of claim 14, wherein the asymmetrical coextrusion is a two layer coextrusion including the ethylene vinyl alcohol layer and said tie sealant resin blend layer.

16. The method of claim 15, wherein the asymmetrical coextrusion is formable using a two resin capable coextruder.

17. The method of claim 13, wherein the tie resin layer is disposed between the ethylene vinyl alcohol layer and the sealant layer.

* * * * *